(12) United States Patent
Yang et al.

(10) Patent No.: US 7,153,597 B2
(45) Date of Patent: *Dec. 26, 2006

(54) MAGNETIC RECORDING MEDIA HAVING CHEMICALLY MODIFIED PATTERNED SUBSTRATE TO ASSEMBLE SELF ORGANIZED MAGNETIC ARRAYS

(75) Inventors: Xiaomin Yang, Sewickley, PA (US); Earl C. Johns, Sewickley, PA (US); Timothy J. Klemmer, Pittsburgh, PA (US); Chao Liu, Pittsburgh, PA (US); Dieter K. Weller, Gibsonia, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 312 days.

This patent is subject to a terminal disclaimer.

(21) Appl. No.: 10/682,690

(22) Filed: Oct. 9, 2003

(65) Prior Publication Data

US 2004/0071924 A1     Apr. 15, 2004

Related U.S. Application Data

(63) Continuation-in-part of application No. 10/005,244, filed on Dec. 3, 2001.

(60) Provisional application No. 60/275,969, filed on Mar. 15, 2001.

(51) Int. Cl.
*G11B 5/64* (2006.01)

(52) U.S. Cl. .................. 428/836; 428/836.1; 428/848.1

(58) Field of Classification Search ..................... None
See application file for complete search history.

(56) References Cited

U.S. PATENT DOCUMENTS

| | | | |
|---|---|---|---|
| 4,656,546 A | 4/1987 | Mallory | |
| 5,139,884 A | 8/1992 | Daimon et al. | |
| 5,210,673 A | 5/1993 | Ito et al. | |
| 5,462,784 A | 10/1995 | Grill et al. | |
| 5,603,766 A | 2/1997 | Visokay et al. | |
| 5,851,644 A | 12/1998 | McArdle et al. | |
| 5,851,656 A | 12/1998 | Ohkubo | |

(Continued)

FOREIGN PATENT DOCUMENTS

JP    2000-311448    7/2000

OTHER PUBLICATIONS

S.H. Charap, Pu-Ling Lu, and Yanjun He, Thermal Stability of Recorded Information at High Densities, IEEE Transactions on Magnetics, vol. 33, No. 1, Jan. 1997.

(Continued)

*Primary Examiner*—Kevin M. Bernatz
(74) *Attorney, Agent, or Firm*—Buchanan Ingersoll & Rooney PC

(57) ABSTRACT

A data storage medium is provided according to the present invention for magnetic recording. The data storage medium includes a substrate having a locking pattern etched therein defining patterned regions. The patterned regions are chemically modified by depositing a self-assembled monolayer therein. A first layer of nanoparticles is provided in the patterned regions on top of the self-assembled monolayer and is chemically bonded to the substrate via the self-assembled monolayer. The first layer of nanoparticles is chemically modified using functional surfactant molecules applied thereto, such that a second layer of nanoparticles may be formed on top of the first layer and chemically bonded thereto via the functional surfactant molecules. Additional layers of nanoparticles may be applied by chemically modifying the top layer of nanoparticles utilizing the functional surfactant molecules and applying a further layer of nanoparticles thereto.

21 Claims, 9 Drawing Sheets

U.S. PATENT DOCUMENTS

| | | | |
|---|---|---|---|
| 5,942,342 | A | 8/1999 | Hikosaka et al. |
| 5,965,194 | A | 10/1999 | Truong et al. |
| 5,981,053 | A | 11/1999 | Naylor et al. |
| 5,993,956 | A | 11/1999 | Lambeth et al. |
| 5,998,002 | A | 12/1999 | Harada et al. |
| 6,162,532 | A | 12/2000 | Black et al. |
| 6,262,129 | B1* | 7/2001 | Murray et al. ............ 516/33 |
| 6,265,021 | B1 | 7/2001 | Black et al. |
| 6,541,386 | B1 | 4/2003 | Aiba et al. |
| 6,562,633 | B1 | 5/2003 | Misewich et al. |
| 6,602,620 | B1* | 8/2003 | Kikitsu et al. ........... 428/842.2 |
| 6,746,825 | B1* | 6/2004 | Nealey et al. ............. 430/315 |
| 2001/0006744 | A1* | 7/2001 | Saito .................. 428/694 TM |
| 2002/0022111 | A1* | 2/2002 | Black et al. ................. 428/138 |
| 2002/0132083 | A1* | 9/2002 | Weller et al. .............. 428/65.3 |
| 2002/0145826 | A1 | 10/2002 | Zangari et al. |
| 2003/0222048 | A1 | 12/2003 | Asakawa et al. |
| 2004/0203256 | A1* | 10/2004 | Yang et al. ................. 438/780 |
| 2004/0229006 | A1* | 11/2004 | Momose et al. ........... 428/65.3 |
| 2005/0009079 | A1* | 1/2005 | Anders et al. ................. 435/6 |

OTHER PUBLICATIONS

Hitachi Develops World Highest Density HD, Apr. 5, 2000 Reuters Company News.

Read-Rite First Shatter 50 Gigabit Per Square Inch Areal Density Barrier, Mar. 30, 2000, PR Newswire.

Fujitsu Develops HDD Media Technology with Potential for 300 Gb/sq.inch Recording Density; 56 Gb/sq.in. Recording Density Already Demonstrated, Apr. 6, 2000, Business Wire.

H.N. Bertram and M. Williams, SNR and Density Limit Estimates: A Comparison of Longitudinal and Perpendicular Recording, IEEE Transactions on Magnetics, vol. 36, No. 1, Jan. 2000.

Dieter Weller, Andreas Moser, Liesl Folks, Margaret E. Best, Wen Lee, Mike F. Toney, M. Schwickert, Jan-Ulrich Thiele and Mary F. Doerner, High $K_u$ Materials Approach to 100 Gbits/in$^2$, IEEE Transactions on Magnetics, vol. 36, No. 1, Jan. 2000.

G. Hughes, "Patterned Media" in Physics of Magnetic Recording, Chapter 7, ed. Plumer, van Elk, Weller, Springer (2001).

Shouheng Sun, C.B. Murray, Dieter Weller, Liesl Folks and Andreas Moser, Monodisperse FePt Nanoparticles and Ferromagnetic FePt Nanocrystal Superlattices Science, Mar. 17, 2000, vol. 287, pp. 1989-1992.

S. Sun, D. Weller and C.B. Murray, "Self-Assembled Magnetic Nanoparticles Arrays" in Physics of Magnetic Recording, Chapter 9, ed. Plumer, van Elk, Weller, Springer (2001).

Andrew C. C. Yu, Mikihisa Mizuno, Yuichi Sasaki, Makoto Inoue, Hirofumi Kondo, Ippei Ohta, David Djayaprawira and Migaku Takahashi "Fabrication of Monodispersive FePt nanoparticles films stabilized on rigid substrates" Applied Physics Letters, vol. 82, No. 24, pp. 4352-4354, Jun. 16, 2003.

\* cited by examiner

MAGNETIC RECORDING MEDIA HAVING CHEMICALLY MODIFIED PATTERNED SUBSTRATE TO ASSEMBLE SELF ORGANIZED MAGNETIC ARRAYS

CROSS-REFERENCE TO RELATED APPLICATIONS

This application is a continuation-in-part application of co-pending patent application Ser. No. 10/005,244 filed on Dec. 3, 2001, entitled "Magnetic Recording Media Having Self Organized Magnetic Arrays", which claims the benefit of provisional patent application Ser. No. 60/275,969 filed on Mar. 15, 2001, entitled "Self Organized Magnetic Arrays (SOMA) for Magnetic Recording Media", the entire disclosures of which are incorporated by reference herein.

FIELD OF THE INVENTION

The present invention is directed toward magnetic recording media and, more particularly, toward magnetic recording media having a chemically modified patterned substrate to assemble self organized magnetic arrays for high-density recording.

BACKGROUND OF THE INVENTION

Increased storage capacity in magnetic recording has traditionally been addressed through improvements in the ability to store information on a particular storage disc with an increased areal density, e.g., decreasing the size of the optical spot formed by the laser light in a magnetooptical system. Until recently, these prior art approaches have been adequate for increasing the storage capacity of magnetic recording discs.

Recently, however, the areal density in magnetic recording technologies has reached 70 Gbit/in$^2$ in certain products, and is increasing at a rate of approximately 600% per year. Data rates are approaching Gbit/s levels and are increasing at a rate of approximately 30–40% per year. An earlier perceived density limit of 40 Gbit/in$^2$ has been surpassed in laboratory demonstrations. Densities higher than 100 Gbit/in$^2$ have been demonstrated. In perpendicular recording technology, densities in the range of 100–500 Gbit/in$^2$ have been targeted, and are considered feasible. These projections are generally based upon scaling assumptions and projected future technological advancements in the areas of read/write heads, recording media, channel electronics, tribological coatings, head-to-disc interface and narrow track servo capabilities.

An area of particular importance in magnetic recording is media noise suppression. At higher areal densities, smaller particles, or grains, are required to reduce the intrinsic media noise and obtain a higher signal-to-noise ratio in the readback data. In addition to reducing and scaling the media grain size, control of the magnetic grain isolation and uniformity and control of the crystallographic texturing are also used to suppress media noise. Achieving low noise media by scaling to a small grain size, however, is limited by thermal instabilities. Such thermal instabilities are exhibited when using grain diameters below approximately 8–10 nm, and may render today's commonly used cobalt-alloy based recording media unsuitable for archival data storage purposes.

It has been found that smaller, stable grains can be obtained from magnetically harder materials, such as tetragonal L1$_0$ phased iron-platinum (FePt) or cobalt-platinum (CoPt) compounds, or artificially layered materials, such as Co/Pt or Co/Pd multilayers. FePt and CoPt compounds are known for their high magnetocrystalline anisotropy and magnetic moment, properties that are desirable for high-density magnetic recording media. Other candidates for smaller, stable grain sizes are rare earth transition metal compounds, such as Co$_5$Sm or Nd$_2$Fe$_{14}$B. However, it may be difficult to maintain these materials in a chemically stable state in hard disc media where minimal overcoat thickness is mandatory.

A common problem with high anisotropy materials, such as FePt and CoPt compounds, is their large coercivity, which can reach values on the order of 50,000 Oe. Such large coercivities far exceed the write field capabilities of today's magnetic recording heads. In an effort to alleviate the problem of large coercivity, vertical recording and thermally assisted recording schemes have been proposed.

Additionally, advances in recording media based on cobalt (Co) are reaching the limits of superparamagnetism, as the conventional scaling approach is to reduce the media grain surface area in proportion to the bit cell surface area. Traditionally, the loss in grain volume has been compensated for by increasing the magnetic anisotropy of the magnetic particles. However, as noted above, the write field capabilities of the recording head limits this approach. The extendibility of this approach also appears to be rather limited. Three times smaller grain diameters, from currently about 9 nm down to about 3 nm, and correspondingly about 10 times higher aerial densities, become feasible if writing to magnetically much harder materials can be accomplished. Chemically ordered FePt alloys (L1$_0$) are key candidates for future generation ultra high-density magnetic recording media, owing to their enhanced magnetic anisotropy and the potential for largely reduced thermally stable grain sizes. However, as previously noted, the chemical stability of these materials presents a problem in the proposed environment in which they are to be used.

Another logical approach to enhancing the aerial density in magnetic recording is to reduce the grain count per bit. On the recording media side, the grain size distribution needs to be trimmed below 10% (sigma over mean) in order to reach grain counts as low as 10 grains per bit, as required in recent Tbit/in$^2$ perpendicular recording models. Current state-of-the-art. sputtered recording media have grain size distributions of approximately 25%, and it remains an open challenge whether the required improvements in grain size distribution can be obtained using physical, thin film sputtering processes.

Lithographically patterned media, also known as bit-patterning, may postpone the arrival of thermal instabilities in the recording media. Bit-patterning combines several hundred media grains into one single magnetic island, which does not require large coercivities. A comprehensive review of such lithographically patterned media techniques can be found in G. Hughes, "Patterned Media" in *Physics of Ultrahigh Density Magnetic Recording*, chapter 7, ed. Plumer, van Ek, Weller, Springer (2001), which reference is hereby incorporated herein by reference. The achievable densities using this bit-patterning lithographic approach is limited by lithography to approximately 1 Tbit/in$^2$. In order to push beyond the density limit set by lithography, self-assembled nanoparticle arrays have been proposed. These self-assembled, ordered and uniform nano-magnet arrays provide conceivable solutions to many proposed future recording schemes, e.g., conventional granular media, perpendicular media, thermally assisted recording and patterned media recording schemes. A representative 6 nm FePt nanoparticle array with typical dimensions and achievable areal densities is shown in FIG. 1.

The specific array 10 shown in FIG. 1 has a surface area of approximately 130×130 nm$^2$ and includes approximately 260 particles per layer. The array 10 has a corresponding particle density per surface area of approximately 10 Tparticles/in$^2$. In future single particle per bit patterned recording schemes, this particle density per surface area could lead to respective areal bit densities of approximately 10 Tbit/in$^2$. However, the use of self-assembled nanoparticle arrays presents many technological challenges.

Colloidal chemistry synthesis and self-assembly procedures have demonstrated great promise in fabricating monodispersed magnetic nanoparticles in large area arrays. Self Organized Magnetic Arrays (SOMAs) may evolve into prospective alternative future ultra-high density magnetic recording media with an areal density potential far beyond 1 Tbit/in$^2$. Fabrication of respective nanostructures with control over size, size distribution and chemical composition, however, remains a major challenge in the formation of nanoparticle arrays.

Whether these self organized magnetic nanoparticle arrays will become practical depends on numerous factors, but one of the main challenges involves the large scale ordering of particles, namely, how to pattern magnetic nanoparticles into organized assemblies on the surface of a disc substrate. As used herein, patterning means the 2-dimensional or 3-dimensional placement and registration of nanoparticles on a substrate with long-range ordering over a large area. Typical FePt arrays have been shown to order on a lateral structural coherence length, (i.e., the distance over which uniform, ordered arrays as shown in FIG. 1 can be formed), on the order of 100–1000 nm. This is far less than required in typical magnetic recording discs, which are approximately 3" in diameter.

The present invention is directed toward overcoming one or more of the above-mentioned problems.

SUMMARY OF THE INVENTION

A data storage medium is provided according to the present invention for magnetic recording. The data storage medium includes a substrate having typographical patterns etched therein. Chemically synthesized iron-platinum nanoparticles are provided in the locking pattern and completely fill the locking pattern. The self-assembled nanoparticles can be monolayer, bilayer or multilayer, which depends on the needs of the particular application. The chemically synthesized iron-platinum nanoparticles exhibit short-range order characteristics forming self-organized magnetic arrays. In addition to chemically synthesized iron-platinum (FePt) nanoparticles, chemically synthesized CoPt, FePd and MnAl nanoparticles, as well as ferroelectric nanoparticles, may also be utilized. However, utilization of ferroelectric nanoparticles will result in ferroelectric storage media, and not magnetic.

The inventive data storage medium includes a substrate having a locking pattern formed therein defining patterned regions, a self-assembled monolayer deposited on the substrate in the patterned regions, and a first layer of nanoparticles deposited on the self-assembled monolayer in the patterned regions and chemically bonded to the substrate via the self-assembled monolayer.

The self-assembled monolayer includes molecules selected from alkyl groups such as, but not limited to, alkylsiloxanes, alkylsilanes and alkylthiols. In one form, the self-assembled monolayer includes functional end groups selected from, but not limited to, —OH, —CHO, —COOH, —SH, —CONH$_2$, —NH$_2$ and —CH$_3$.

In another form, the inventive data storage medium further includes a layer of functional surfactant molecules deposited on the first layer of nanoparticles in the patterned regions, and a second layer of nanoparticles deposited on the layer of functional surfactant molecules in the patterned regions and bonded to the first layer of nanoparticles via the functional surfactant molecule layer. The functional surfactant molecules may include molecules selected from, but not limited to, adipic acid, adipamide, adiponitrile, dodecanedioic acid, 1,12-dodecanediol, dodecanedioyl dichloride, poly(vinulpyrrolidone) (PVP) and poly(ethylenimine). Additionally, the functional surfactant molecules may include functional end groups selected from, but not limited to, —OH, —CHO, —COOH, —SH, —CONH$_2$, —NH$_2$ and —CH$_3$.

In a further form, the chemically synthesized iron-platinum nanoparticles have a grain size of 3–10 nm, and the locking pattern formed in the substrate includes a pit depth of 5–30 nm, with 10–20 nm being the preferred pit depth. Typically, the chemically synthesized iron-platinum nanoparticles include a self-assembly-coherence length scale of 100–1000 nm.

For longevity purposes, the data storage medium is typically provided with a protective layer of carbon covering and the chemically synthesized iron-platinum nanoparticles which are self-assembled in the locking pattern. In addition to carbon, other protective layers may include CH, CN, CHN, CH/CF, AlN, SiN, BN, etc., and also other films like MgO, Al$_2$O$_3$, TiN, TiC, etc. The substrate is generally made of glass, quartz, Si, SiO$_2$, ceramic or AlMg.

A method for manufacturing a data storage medium for magnetic recording according to the present invention is also provided. In its basic form, the inventive method includes providing a substrate, forming a locking pattern in the substrate defining patterned regions, and depositing nanoparticles in the patterned regions of the locking pattern such that the nanoparticles self-assembled in the locking pattern forming self organized magnetic arrays.

In one form of the inventive method, the step of depositing nanoparticles in the patterned regions of the locking pattern includes the steps of chemically modifying the patterned regions, and depositing nanoparticles in the chemically modified patterned regions such that the nanoparticles self-assemble in the patterned regions and chemically bond to the substrate.

In another form of the inventive method, the step of chemically modifying the patterned regions includes the step of depositing a self-assembled monolayer in the patterned regions. The self-assembled monolayer may include molecules selected from alkyl groups such as, but not limited to, alkylsiloxanes, alkylsilanes and alkylthiols. Additionally, the self-assembled monolayer may include functional end groups selected from, but not limited to, —OH, —CHO, —COOH, —SH, —CONH$_2$, —NH$_2$ and —CH$_3$.

In still another form, the inventive method includes the steps of washing the magnetic recording substrate such that a first layer of nanoparticles is retained in the patterned regions, chemically modifying the first layer of nanoparticles, and depositing further nanoparticles in the patterned regions such that a second layer of nanoparticles bonds to the chemically modified first layer of nanoparticles.

In a further form of the inventive method, the step of chemically modifying the first layer of nanoparticles includes the step of depositing a layer of functional surfactant molecules in the patterned regions on the first layer of nanoparticles. The functional surfactant molecules may include molecules selected from, but not limited to, adipic acid, adipamide, adiponitrile, dodecanedioic acid, 1,12-dodecanediol, dodecanedioyl dichloride, poly(vinulpyrrolidone) (PVP) and poly(ethylenimine). The functional surfactant molecules may additionally include functional end groups selected from, but not limited to, —OH, —CHO, —COOH, —SH, —CONH$_2$, —NH$_2$ and —CH$_3$.

In yet a further form, the inventive method may include the step of washing the substrate such that only the first and second layers of nanoparticles are retained in the patterned regions.

In an additional form, the inventive method includes the steps of chemically modifying the second layer of nanoparticles by applying a layer of functional surfactant molecules thereto, depositing nanoparticles in the patterned regions such that a third layer of nanoparticles bonds to the chemically modified second layer of nanoparticles, and washing the substrate such that only the first, second and third layers of nanoparticles are retained in the patterned regions. Additional layers of nanoparticles may be applied to the substrate in a manner similar to the application of the second and third layers of nanoparticles.

In still a further form of the inventive method, the nanoparticles include chemically synthesized magnetic, or ferroelectric, nanoparticles (preferably iron-platinum) having a grain size of approximately 3–10 nm. The locking pattern formed in the substrate includes a pit depth of 5–30 nm, with 10–20 nm being the preferred depth.

In another form of the inventive method, the locking pattern is formed in the substrate by applying a layer of photoresist on the substrate, removing select portions of the photoresist to form a topographical pattern corresponding to the locking pattern, and etching the locking pattern, i.e., patterned regions, into the substrate in areas where the photoresist has been removed.

The locking pattern may be etched into the substrate using a reactive ion etching process. The topographical pattern may be formed in the photoresist layer using optical lithography, electron beam lithography, deep ultraviolet (UV) lithography, extreme UV (EUV) lithography or nano-imprinting techniques.

It is an aspect of the present invention to combine advanced lithography techniques with molecular self-assembly principles to pattern nanoparticles into organized assemblies on the surface of a substrate.

It is a further aspect of the present invention to pattern magnetic nanoparticles into organized assemblies on the surface of a substrate.

It is an additional aspect of the present invention to chemically modify a topographical pattern formed on a substrate to assemble self organized magnetic arrays as patterned media for magnetic recording discs and other data storage media.

Other aspects and advantages of the present invention can be obtained from a study of the specification, the drawings, and the appended claims.

BRIEF DESCRIPTION OF THE DRAWINGS

FIG. 13a is a TEM image of an FePt nanoparticle array;

FIG. 13b is a graph of the size distribution of the nanoparticles shown in FIG. 13a;

DETAILED DESCRIPTION OF THE INVENTION

Figure 1:
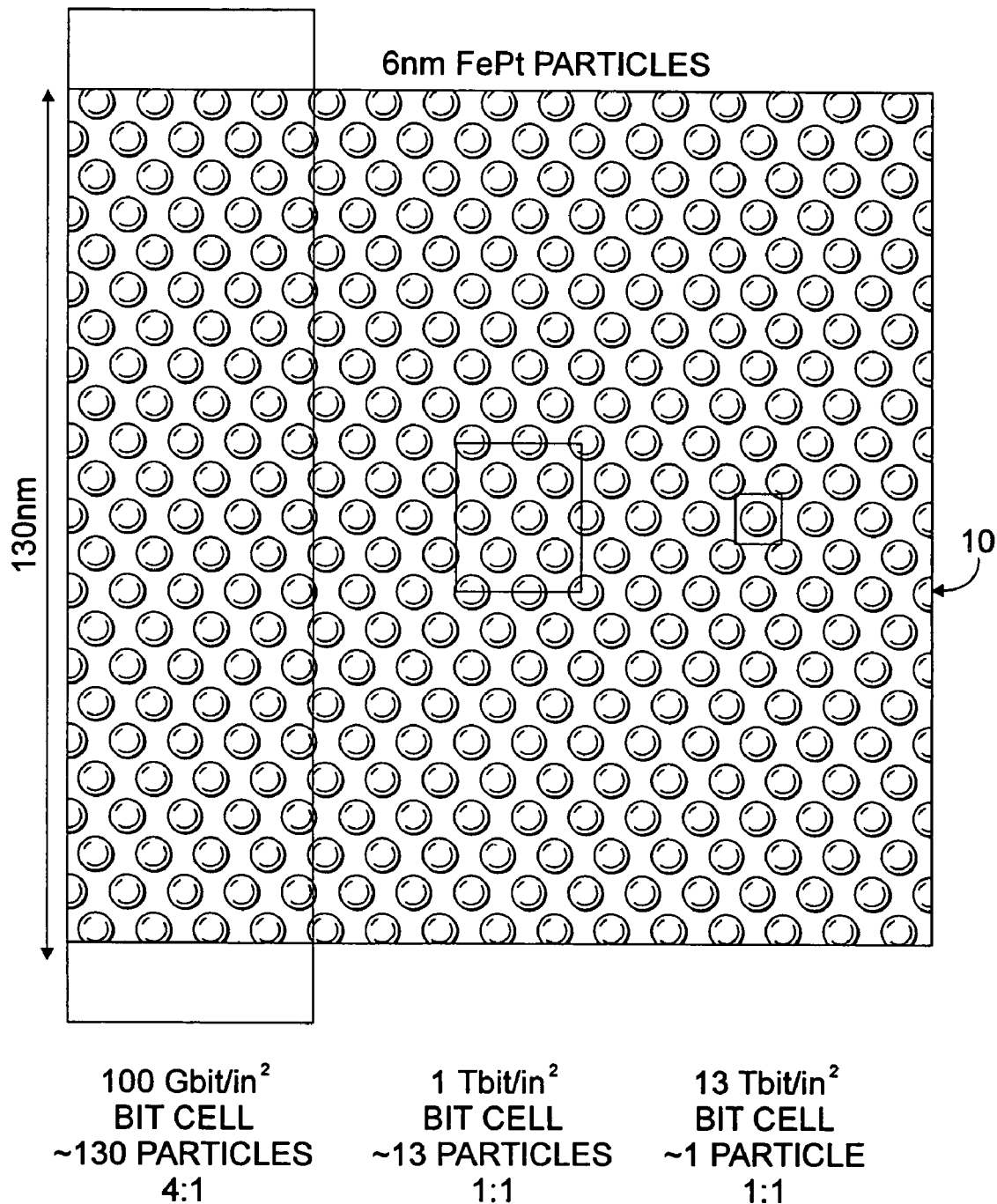
FIG. 1 is a representation of a prior art 6 nm FePt nanoparticle array.
Figure 2:
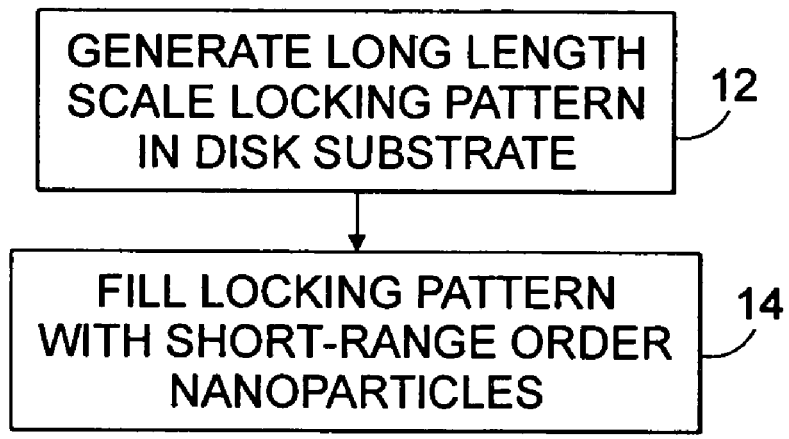
FIG. 2 is a block flow diagram of the inventive method of manufacturing a magnetic recording disc.

As illustrated in FIG. 2, the magnetic recording disc of the present invention is generally manufactured utilizing a two-step fabrication process. The first step, shown at 12, includes pre-patterning a magnetic recording disc substrate to generate a long length scale topographic locking pattern on the disc substrate. In the second step of the inventive method, shown at 14, the locking pattern is filled with short-range order magnetic nanoparticles. The short-range order characteristics exhibited by the nanoparticles are such that nanoparticles will form an ordered structure across a short length scale. The nanoparticles form self-organized magnetic arrays and planarize the disc substrate surface. One method of generating the locking pattern in the disc substrate will now be described with respect to FIGS. 3–8.

Figure 3:
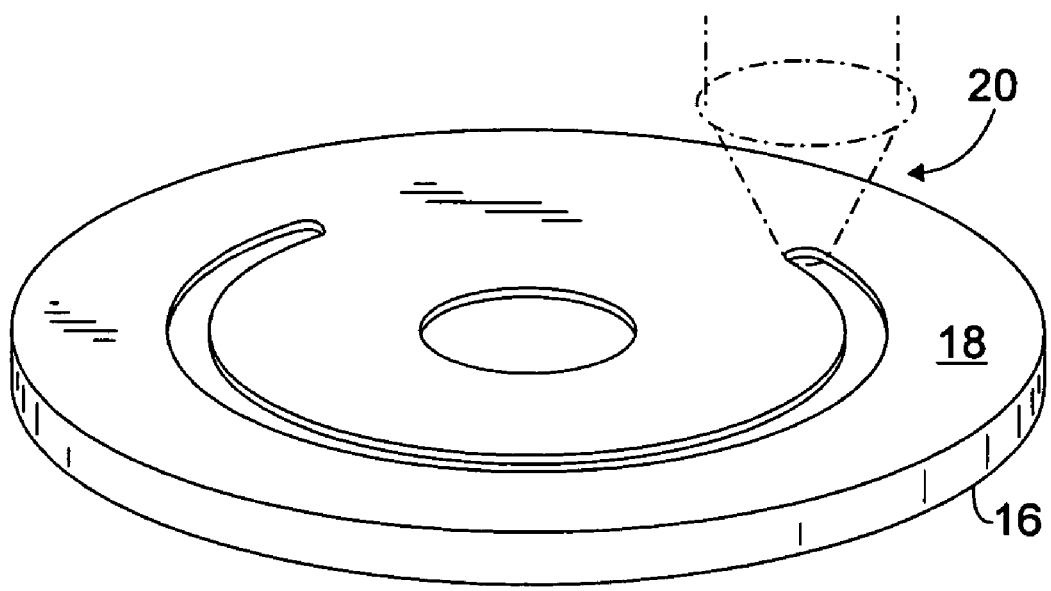
FIG. 3 is a perspective view of a disc substrate with a photoresist layer used in the manufacture of the inventive magnetic recording disc.
Figure 4:
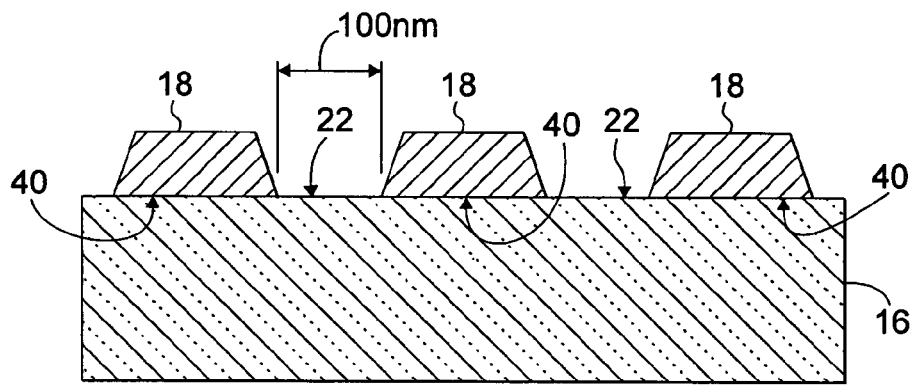
FIG. 4 is a side view of a section of the substrate and photoresist shown in FIG. 3 after removal of certain portions of the photoresist.

FIG. 3 illustrates a magnetic recording disc substrate 16 having a layer of photoresist 18 provided thereon. Select portions of the photoresist layer 18 are removed, as shown at 20, to form a topographical pattern in the photoresist layer 18. The inventive method contemplates forming the topographical pattern in the photoresisit layer 18 using a variety of methods, such as, but not limited to, standard laser beam lithography, electron beam lithography, deep UV lithography and nano-imprinting techniques. FIG. 4 illustrates a section of the substrate 16 and photoresisit 18 of FIG. 3 after removal of portions of the photoresist 18 to form the topographical pattern. Depending upon the type of storage solution in which the magnetic recording disc is designed to be used, e.g., spinning disc magnetic storage or non-rotating magnetic storage (xy-matrix probe storage), the magnetic disc recording substrate 16 may be made of a variety of materials, including, but not limited to, AlMg, glass, ceramic, Si, quartz, $SiO_2$, etc.

After removal of the photoresist 18, a locking pattern is etched into the disc substrate 16 in areas 22 where the photoresist 18 has been removed. In one example, the locking pattern is etched into the disc substrate 16 utilizing a reactive ion etching process, and has typical dimensions of sub-micron down to 100 nm. After the locking pattern has been etched into the disc substrate 16, any photoresist 18 remaining on the disc substrate 16 is removed. The locking pattern, as used herein, is the prepatterned region or etched pits on the disc substrate sized such that the length scale of the region or pits is compatible with the self-ordering scale of the nanoparticles.

Figure 5:
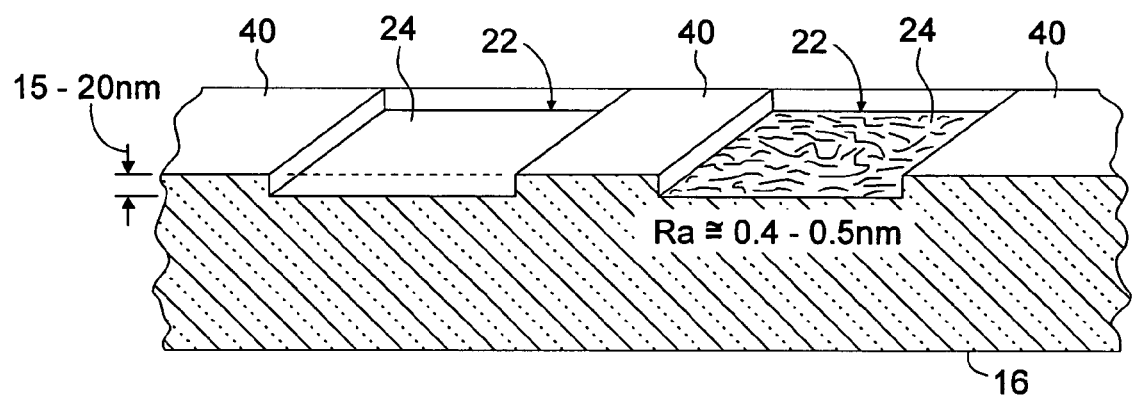
FIG. 5 is a perspective view of a section of the disc substrate after a locking pattern has been etched in the disc substrate.
Figure 6:
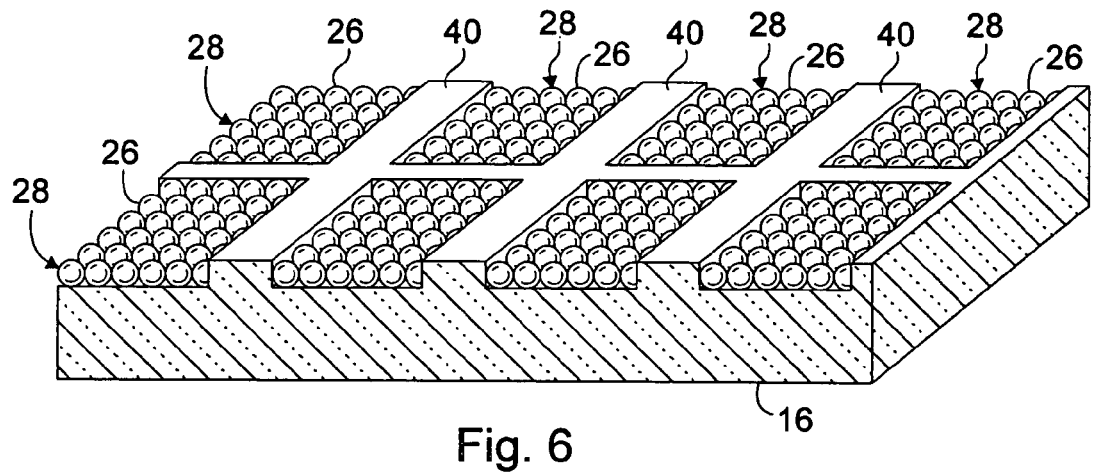
FIG. 6 is a perspective view of a section of the disc substrate after nanoparticles have self-assembled in the locking pattern.

As shown in FIG. 5, the locking pattern includes a pit depth ranging between 5–20 nm deep, depending upon the size the nanoparticles to be used in subsequent processing. Using a reactive ion etching process, the surface 24 of each pit forming the locking pattern will have a roughness (Ra) equal to approximately 0.4–0.5 nm. Various type of locking patterns may be utilized, including, but not limited to, a square pit pattern (see FIG. 6) for a set of one or more bits, or a groove pattern (see FIG. 7) for a set of one or more tracks, or islands in certain locations to create a coarse grid to stabilize the fine grid formed by the nanoparticles deposited in the locking pattern.

Additionally, the locking pattern may act as a servo pattern providing positioning information usable by a magnetic read/write head (not shown). Altering the sizes and shapes of the pits forming the locking pattern in accordance with a predefined servo pattern would enable the magnetic read/write head to determine its location on the surface of the magnetic recording disc.

Instead of utilizing the photoresist layer 18, the topographical pattern may be nanoimprinted directly onto a Sol-Gel-type coating on the disc substrate 16 (for instance, a solution of TEOS, water, and $HNO_3$), leaving the desired topographical pattern after drying. The locking pattern is then etched in the disc substrate 16, and the Sol-Gel-type coating is removed. Alternatively the topographical pattern formed in the Sol-Gel-type coating could itself serve as the locking pattern. The Sol-Gel-type coating would remain on the disc substrate 16, and nanoparticles 26 would be deposited into the topographical/locking pattern formed in the Sol-Gel-type coating in the same manner as the nanoparticles are deposited into the locking pattern in the disc substrate 16, which will be described hereafter. A third option is to create a flat chemically activated surface consisting of two types of chemical substances spatially separated according to the desired topographical pattern. One type of chemical attracts and the other type repels the nanoparticles. These types of chemically active, patterned monolayers may be prepared using a number of well known techniques, such as ionic molecular self-assembly processes.

After the locking pattern has been etched into the disc substrate 16, the discs are "planarized" by filling the locking pattern with nanoparticles 26 such that the nanoparticles, self-assemble into the locking pattern forming magnetic arrays 28. In one example, the nanoparticles 26 include chemically synthesized iron-platinum nanoparticles which exhibit laterally structural coherence length properties on the order of 100–1000 nm. The chemically synthesized iron-platinum nanoparticles 26 self-assemble into the locking pit pattern according to various well known techniques, such as those set forth in S. Sun, C. B. Murray, D. Weller, L. Folks and A. Moser, Science 287, 289 (2000), and S. Sun, D. Weller and C. B. Murray, "Self-Assembled Magnetic Nanoparticle Arrays" in *Physics of Magnetic Recording,* chapter 9, ed. Plumer, van Ek, Weller, Springer (2001), which references are hereby incorporated herein by reference. The locking pattern is formed in the disc substrate 16 according to the self-assembly coherence length scale of the iron-platinum nanoparticles and, accordingly, the iron-platinum nanoparticles self-assemble therein. In one example, the iron-platinum nanoparticles include a grain size of 4 nm, however, grain sizes ranging from 3–10 mn may be utilized without departing from the spirit and scope of the present invention.

Additionally, while the present invention has been described herein as using iron-platinum (FePt) nanoparticles, other high anisotropy materials having appropriate $L1_0$ phase characteristics may be utilized without departing from the spirit and scope of the present invention. Such high anisotropy $L1_0$ phased materials include, but are not limited to, CoPt, FePd, MnAl, etc.

Figure 7:
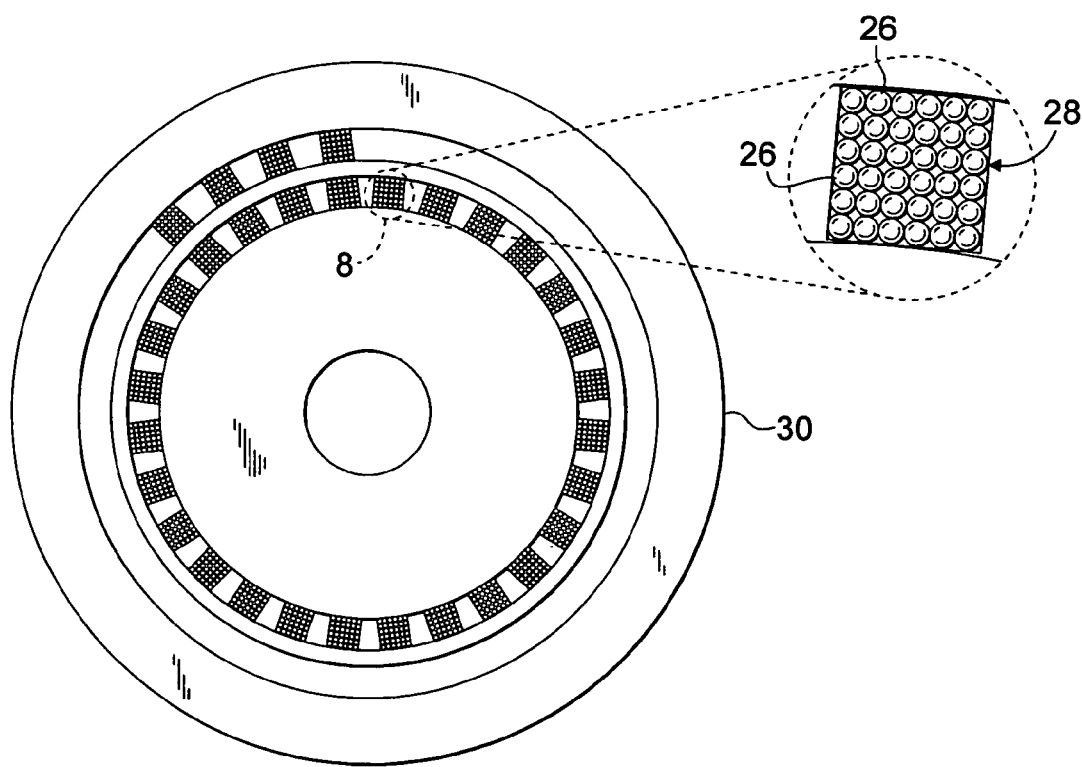
FIG. 7 is a top view of the inventive magnetic recording disc illustrating the formation of magnetic arrays in a grooved locking pattern.

FIG. 7 illustrates the finished inventive magnetic recording disc 30 having a grooved pit pattern. The exploded portion illustrates the self-assembled magnetic arrays 28 formed by the nanoparticles 26 in the grooved pit pattern.

Figure 8:
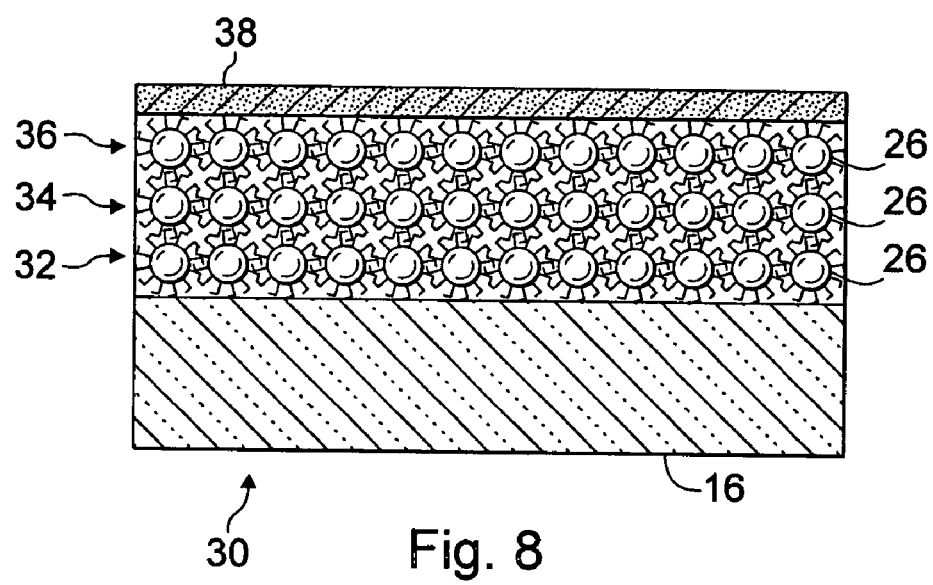
FIG. 8 is a side view of a section of the inventive magnetic recording disc illustrating three layers of self-assembled nanoparticles and a carbon coating on the disc surface.
Figure 9:
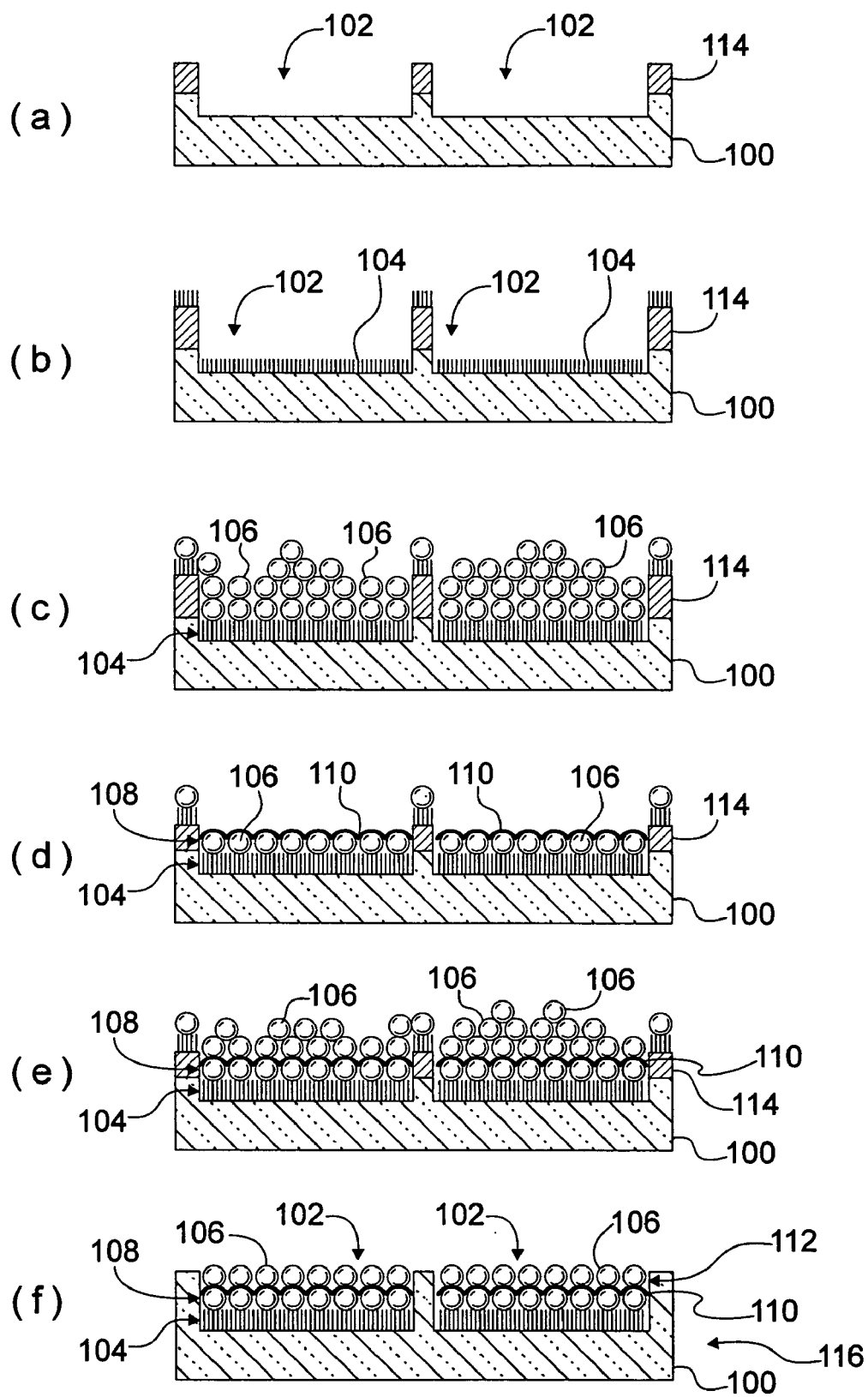
FIGS. 9a–f schematically illustrate an alternate process according to an additional embodiment of the present invention for patterning nanoparticles into organized assemblies on the surface of a substrate.
Figure 10:
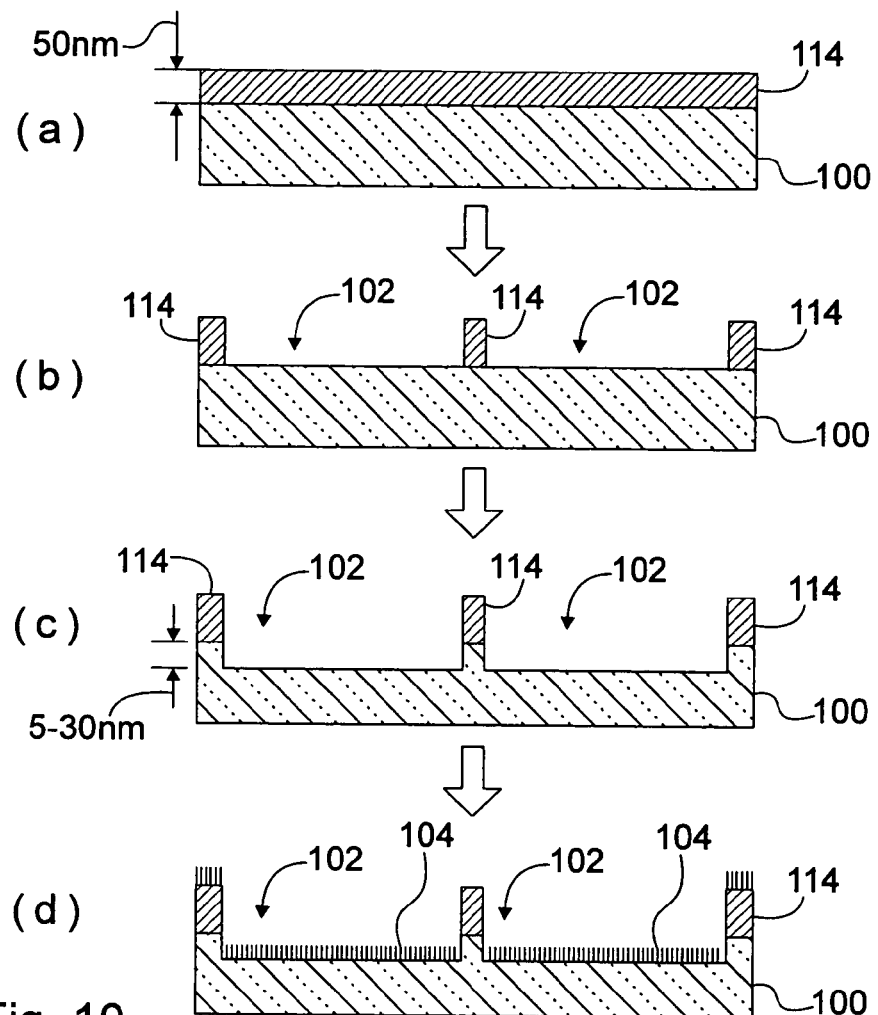
FIGS. 10a–d schematically illustrate the process of preparing a chemically modified patterned substrate for the assembly of nanoparticles.

Depending upon the pit depth of the locking pattern and the grain size of the iron-platinum nanoparticles 26, two or more layers of nanoparticles 26 may self-assemble in the locking pattern. FIG. 8 illustrates the self-assembly of three layers, 32, 34 and 36 of iron-platinum nanoparticles 26 in the locking pattern. Typically, as shown in FIG. 8, a protective coating layer 38 is provided over the entire surface of the disc substrate 16 and formed nanoparticle arrays 28 for longevity of use purposes. The protective coating layer 38 protects the magnetic recording media against damage from direct contact with the read/write head and also serves as a corrosion barrier to prevent oxidation of the magnetic recording media. The protective coating layer may be made of a variety of materials having appropriate protective properties, including, but not limited to, carbon and diamond like carbon (hydrogenated carbon, nitrogenated carbon, fluoronated carbon, etc.) and nitrides, such as, silicon-nitride, aluminum-nitride, etc. The surfactant molecules, as will be described herein with respect to FIGS. 9–15, or their decomposed residual carbon around the nanoparticles can also serve as the protective coating layer 38.

Additionally, chemically active substances maybe provided on the disc substrate 16 surface to assist in nanoparticle 26 assembly. For example, a first chemical substance may be deposited on the disc substrate 16 at the areas 22 corresponding to the locking pattern. A second chemical substance may be deposited on the disc substrate 16 at areas 40 not corresponding to the locking pattern. The first chemical substance will have properties such that it attracts the nanoparticles 26, such that a chemical covalent bond is formed between the first chemical substance and the nanoparticles, while the second chemical substance will have properties such that it repels the nanoparticles 26, such that no bond forms between the second chemical substance and the nanoparticles. Thus, by applying such chemical substances on the disc substrate 16 surface, which can be applied during or after generation of the locking pattern, it is possible to further manipulate the areas in which the nanoparticles 26 will self-assemble to form the magnetic arrays 28.

As an alternative to providing two types of chemical substances to attract and repel the nanoparticles, respectively, one layer of chemical substance may be provided and modified by selectively replacing the end-groups of the chemical substance. Since the end-groups of the chemical substances can provide the bonding to the nanoparticles, selectively modifying the endgroups results in a chemical substance that either attracts or repels the nanoparticles 26 as desired. Such modification may be accomplished by local oxidation or reduction by exposure to UV-light, deep UV-light, extreme UV (EUV)-light, x-rays, e-beam or laser beam in an appropriate chemical environment.

As a further alternative to providing two types of chemical substances, the disc substrate 16 may be coated with a thin layer (e.g., 5–20 nm) of the second chemical substance that repels the nanoparticles 26. Using any of the above-described techniques, the locking pattern is etched through the thin layer (second chemical substance) and into the disc substrate 16. The locking pattern formed in the disc substrate 16 is dimensioned to attract the nanoparticles 26 due to the coherence length properties of the nanoparticles 26, while the thin layer of the second chemical substance repels the nanoparticles 26 aiding in nanoparticle 26 formation in the locking pattern. The thickness of the nanoparticle repellant layer is determined by the depth of the locking pattern, with the underlying disc substrate 16 providing an ideal etch stop to the etching process.

FIGS. 9a–f illustrate an alternate process according to an additional embodiment of the present invention for patterning nanoparticles into organized assemblies on the surface of a substrate. This alternate process combines advanced lithography techniques with molecular self-assembly principles, and uses a chemical modification of the topographical pattern in the substrate to assemble self-organized magnetic arrays of nanoparticles as patterned media for use in, for example, magnetic recording discs. The topographical pattern is achieved by advanced lithography techniques, and the chemical modification of the topographical pattern is achieved through the use of self-assembled monolayers (SAMs).

FIG. 9a illustrates a recording disc substrate 100 having a locking pattern formed therein using advanced lithography techniques. The locking pattern formed in the substrate 100 defines patterned regions 102 into which the nanoparticles will be assembled. As shown in FIG. 9b, the patterned regions 102 are chemically modified by depositing a layer of SAMs 104 therein. The SAMs 104 are highly ordered molecular assemblies which form on the substrate 100 and are driven by thermodynamics to form extremely high coverage films. As a result of utilizing the SAMs 104 for the assembly of nanoparticles on the substrate 100, self-assembly of the nanoparticles is thus automatically defect rejecting and self-registering on a scale of molecular dimensions.

FIG. 9c illustrates the deposition of nanoparticles 106 into the chemically modified patterned regions 102. After the nanoparticles 106 are deposited into the patterned regions 102 on top of the layer of SAMs 104, the substrate 100 is washed with a conventional solvent such that only a first layer 108 of nanoparticles 106 is retained in the patterned regions 102, as shown in FIG. 9d. The first layer 108 of nanoparticles 106 is chemically bonded to the substrate 100 via the SAMs 104, as will be described herein infra.

After the washing step to retain the first layer 108 of nanoparticles 106 in the patterned regions 102, the first layer 108 of nanoparticles 106 is chemically modified by depositing a layer of functional surfactant molecules (FSMs) 110 to the first layer 108 in the patterned regions 102. Following chemical modification of the first layer 108, nanoparticles 106 are deposited into the patterned regions 102 on top of the chemically modified first layer 108, as shown in FIG. 9e.

The substrate 100 is again washed (see FIG. 9f) using a conventional solvent such that a second layer 112 of nanoparticles 106 is retained on top of the first layer 108, and is chemically bonded to the first layer 108 via the FSM layer 110, as will be described herein infra. Additionally, the resist 114 that was utilized to form the locking pattern is then stripped from the substrate 100 to form the magnetic recording disc, as shown at 116, including the patterned arrays of nanoparticles 106. Further layers of nanoparticles may be applied using the method previously described for forming the second layer 112 of nanoparticles 106.

The grid-like patterned regions 102 are prepared by advanced lithography techniques, such as, electron beam lithography, X-ray lithography, extreme ultraviolet (EUV) lithography, ion beam lithography, nanoimprinting, etc. Since advanced lithography has a resolution of sub-10 nm with a linewidth fluctuation of less than 2 nm, the patterned regions 102 of the locking pattern can be defined very precisely and accurately so that the nanoparticles 106 are strictly restrained within the patterned regions 102 registered with the substrate 100.

In one implementation, as shown in FIGS. 10a–d, the substrate 100 includes a silicon (Si) wafer and is coated with commercially available photoresist 114 materials, e.g., UV113, with a thickness of approximately 50 nm. Then, the resist 114 is exposed with electron beam radiation (electron beam writing) for patterning. After exposure, the resist 114 is baked and then developed in a solvent. After drying the developed substrate 100, the locking pattern which defines the patterned regions 102, is formed on the disc substrate 100, as shown in FIG. 10b. The patterned regions 102 are transferred into the underlying substrate 100 by reactive ion etching. processes, as shown in FIG. 10c. It is contemplated herein that the patterned regions 102 formed by the etching process will have a depth of approximately 5–30 nm, with a preferred depth being approximately 10–20 nm. While silicon has been set forth herein as utilized for the substrate 100, it should be understood that the substrate 100 may be made of a variety of materials, including, but not limited to, AlMg, glass, ceramic, Si, quartz, $SiO_2$, etc.

Following formation of the patterned regions 102 in the substrate 100, the typographically patterned substrate 100 is selectively modified so that only the selected regions, e.g., the patterned regions 102, are modified, as shown in FIG. 10d. Because the patterned regions 102 are chemically modified, nanoparticles 106 in these regions are chemically bonded to the substrate 100 resulting in a strong attachment of the nanoparticles 106 to the substrate 100 to avoid sintering during the post-deposition annealing process.

As shown in FIG. 10d, the layer of SAMs 104 is used to chemically modify the patterned regions 102 of the substrate 100. There are several advantages to using SAMs for such chemical modification. SAMs are highly ordered molecular assemblies formed on the substrate 100 and driven by thermodynamics to form extremely high coverage films. As previously noted, by utilizing SAMs for the assembly of nanoparticles 106 on the substrate 100, self-assembly of the nanoparticles 106 is thus automatically defect rejecting and self-registering on a scale of molecular dimension. Additionally, SAMs provide a pure chemically homogenous surface with a monolayer thickness of approximately 1–2 nm (see FIG. 14b). Further, the surface chemistry properties are easily controlled by the selective use of terminated functional groups of SAMs to. meet the reeds of nanoparticle assembly. For example, by selecting proper functional groups of SAMs molecules, the nanoparticles 106 can be self-assembled on the substrate 100 via chemical bonding as will be describe below. This allows extension of the short-range ordering of the nanoparticles 106 to long-range ordering over large areas of micrometer dimensions with low defect density.

It is contemplated herein to utilize molecules of alkylsiloxanes as the SAMs 104. The use of alkylsiloxanes as the SAMs 104 has a number of advantages, in that alkylsiloxanes can form on technologically relevant substrates, such as native oxide layers of silicon, oxidized metals or polymeric planerizing layers, and have a high degree of stability due to the Si-O-substrate covalent linkage. SAMs of alkylsiloxanes are also thermally stable under vacuum up to temperatures of 740° K., and can be molecularly engineered to be highly sensitive to various types of radiation, including electron beam, deep ultraviolet (DUV), X-ray and extreme ultraviolet (EUV) radiation, with a resolution of less than 10 nm. In addition to utilizing alkylsiloxanes as the SAMs 104, other alkyl groups such as alkylsilanes and alkylthiols may be utilized for the SAMs 104 without departing from the spirit and scope of the present invention.

Figure 11:
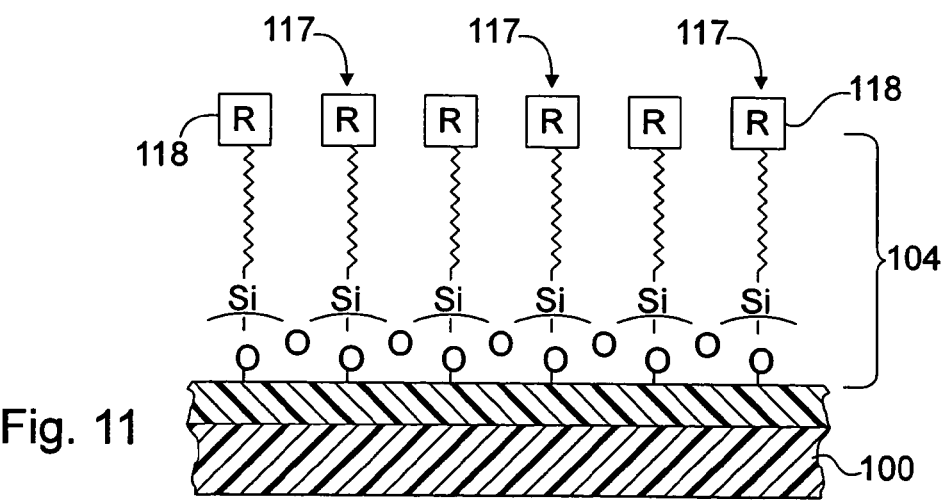
FIG. 11 illustrates a self-assembled monolayer of alkylsilane on a silicon substrate.

The SAMs 104 may be deposited into the patterned regions 102 by various methods, such as, but not limited to, immersion deposition, vapor evaporation and spin coating. As shown in FIG. 11, each SAM molecule 117 preferably includes a functional end group 118 terminated with a polar functional group for increased bonding with the nanoparticles 106. The functional end group 118 may include end groups such as, but not limited to, —OH, —CHO, —COOH, —SH, —CONH$_2$, —NH$_2$ and —CH$_3$.

A number of different materials have been considered for nanoparticle storage applications. Some of these materials include nanoparticles made of FePd, FePt, CoPt and MnAl. While the inventive process set forth herein is described utilizing FePt particles, any of the previously mentioned materials maybe utilized for the nanoparticles 106 without departing. from the spirit and scope of the present invention.

FePt alloys are an important class of materials in permanent magnet applications because of their extremely large uniaxial magnetocrystalline anisotropy ($K_u = 7*10^6$ J/m$^3$) and good chemical stability. As the magnetic stability of the individual particles scales with the anisotropy constant ($K_u$) and particle volume (V), FePt particles become suitable for ultra-high density magnetic recording media applications.

Figure 12:
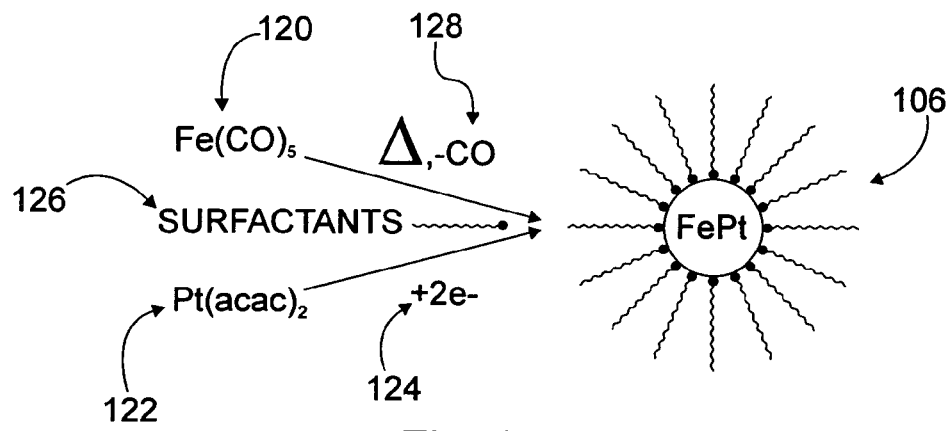
FIG. 12 schematically illustrates the synthesis of high anisotropy FePt nanoparticles.
Figure 13:
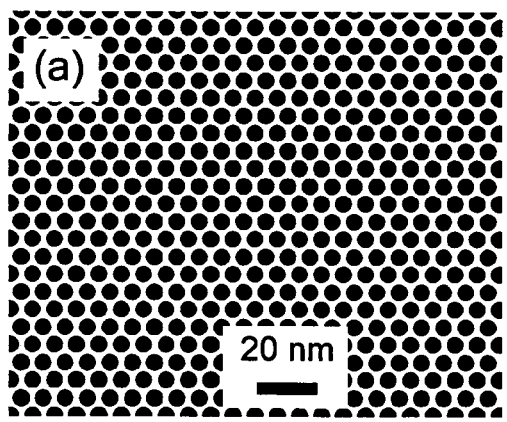
Figure 13:
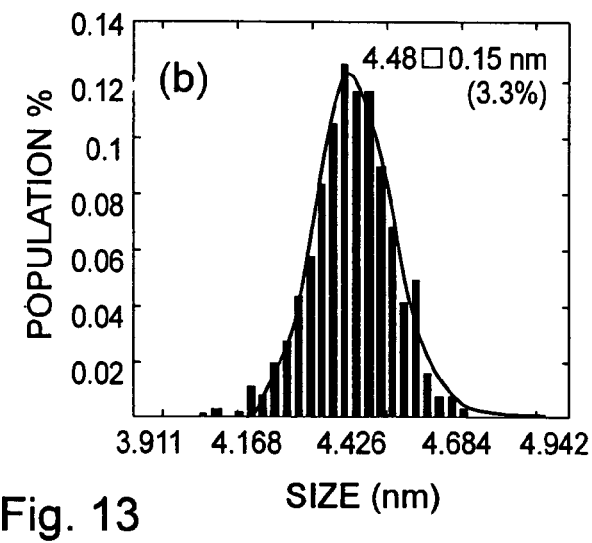
Figure 14:
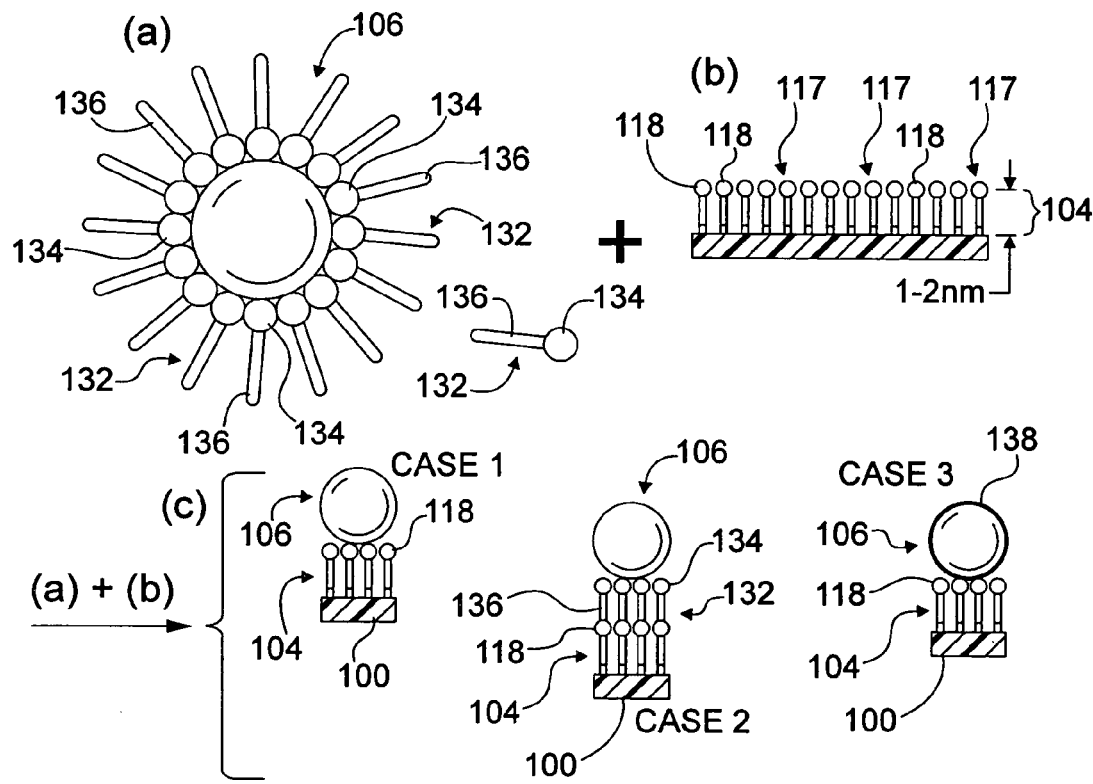
FIGS. 14a–c schematically illustrate three possible methods for chemically bonding nanoparticles to the chemically modified patterned formed in the substrate.

Chemically disordered FePt nanoparticles are synthesized using a known approach based on the decomposition of iron pentacarbony and the reduction of platinum acetylacetonate, as shown in FIG. 12. The iron pentacarbony 120 and platinum acetylacetonate 122 are combined with a reducing agent 124 and surfactants 126, and heated (as shown at 128) to produce the synthesized FePt nanoparticles surrounded by surfactants, as shown at 106. The size and composition of the FePt nanoparticles 106 can be readily controlled. Their composition is adjusted by controlling the molar ratio of iron carbonyl to the platinum salt. The FePt particle size can be adjusted from 3 to 10 nm by first growing 3 nm monodispersed seed particles in situ, and then adding more reagents to enlarge the existing seeds to the desired size. FIG. 13a illustrates a TEM image of FePt nanoparticles, having a size distribution of 4.48 ±01.5 nm, as illustrated in FIG. 13b. These particles are isolated and purified by centrifugation after the addition of a flocculent, such as ethanol, and can be redisbursed in nonpolar solvents in the presence of surfactant molecules, e.g., oleic acid and oleylamine, in a variety of concentrations.

The nanoparticles 106 may be chemically bonded to the SAMs modified patterned regions 102 of the locking pattern in three possible ways. FIG. 14a illustrates the nanoparticle 106 which includes a surfactant 132 surrounding it. The surfactant 132 includes a polar head 134 and a nonpolar tail 136, as show in FIG. 14a. FIG. 14b illustrates the SAMs 104 attached to the substrate 100. As shown in FIG. 14b, the SAMs 104 are approximately 1–2 nm in height and include the functional end group 118. Because the attraction force between the nanoparticles and the functional groups of surfactant molecules 132 around the particles (e.g., —COOH for oleic acid, and —NH$_2$ for oleylamine) is a van der Waals Force or induced dipole interaction, this force is relatively weak. The surfactant 132 molecules around the particles are easily replaced, for example, by other types of surfactant molecules. The surfactant molecules can be replaced by the functional end groups 118 (—COOH, —CHO, —OH, —SH, —CONH$_2$, —NH$_2$, —CH$_3$) from the SAMs 104 in the patterned regions 102. Therefore, as the nanoparticles 106 are deposited into the patterned regions which include the SAM layer 104 inside the patterned regions 102 on the substrate 100, the selected polar functional groups 118 (—COOH, —CHO, —OH, —SH, —CONH$_2$, —NH$_2$, —CH$_3$) of the SAMs 104 with selected polarization power can replace the surfactant molecules around the nanoparticles and then form chemical bonds, or at least have stronger induced dipole interactions, between the particles and the functional end groups 118 (—COOH, —CHO, —OH, —SH, —CONH$_2$, —NH$_2$, —CH$_3$) of the SAMs 104.

Figure 15:
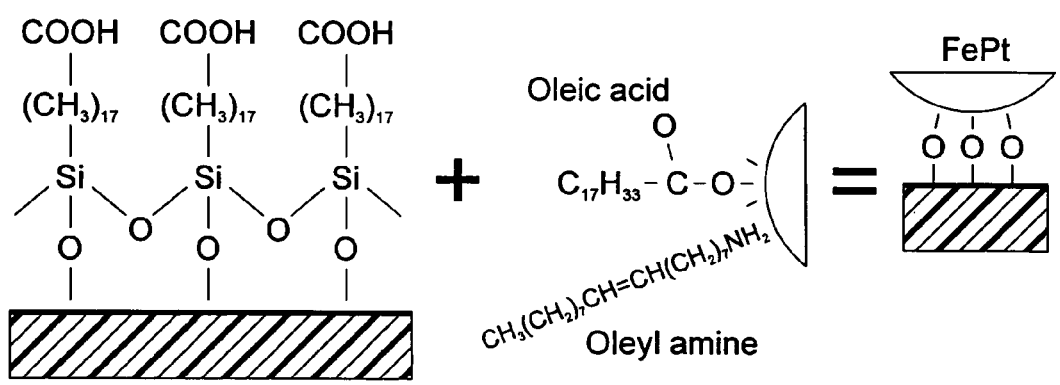
FIG. 15 illustrates the chemical bonding of the nanoparticles to the chemically modified patterned regions of the substrate according to Case 1 in FIG. 14c.

The attraction forces for the surfactant molecules around the particles are van der Waals forces that are very weak. After the first washing process, the first layer of nanoparticles 108 are built into the patterned regions 102 on the substrate 100, as shown in FIG. 9d. By selective control the relative bond energy for the FePt particles, and replacing the former surfactants molecules around the particles by the molecules of the SAMs 104, the nanoparticles 106 are registered onto the substrate 100 via the SAMs 104. This is illustrated in Case 1 of FIG. 14c, with FIG. 15 showing a detailed example of the chemical bonding according to Case 1 using —COOH as the functional end group 118.

Based on the variety of surfactant molecules available, some functional surfactant molecules with functional groups at the end of the tail, or in the middle of the carbon chain, can be utilized to have certain chemical reactions with the functional end groups 118 (—COOH, —CHO, —OH, —SH, —CONH$_2$, —NH$_2$, —CH$_3$) in the patterned regions 102 having the layer of SAMs 104 therein. The SAMs 104 in the patterned regions 102 are chemically bonded to the surfactants 132 included around the nanoparticles 106. The chemical reactions may include, but are not limited to, the condensation reactions as shown in Case 2 of FIG. 14c, where the functional end group 118 of the SAMs 104 bonds to the nonpolar tail 136 of the surfactant 132 to bond the nanoparticle 106 to the substrate 100.

Additionally, the FePt particles 106 may be coated with inorganic materials, such as silicon oxides, noble metals, transition metal oxides, etc., as shown at 138. Not only are the FePt particles 106 protected by the coating 138 to prevent possible oxidation problems, but the coating 138 also modifies the surface properties of the nanoparticles 106. Therefore, much more flexibility in selecting the molecules for the SAMs 104 is available. The inorganic coating 138 will not be removed by the washing processes, and will bond with the functional end groups 118 of the SAMs 104 as shown in Case 3 of FIG. 14c. For example, by selection of the SAMs 104 terminated with a thiol group (SH), and coating of the FePt particles 106 with Au, a very strong Au—S chemical bond would be obtained, thus bonding the nanoparticles 106 to the substrate 100 via the SAMs 104.

As explained previously, the remaining surfactant molecules 132 on the nanoparticles 106 that are relatively weakly bonded to the first layer of nanoparticles 108 are easily replaced by other kinds of functional surfactant molecules. Therefore, the first layer of nanoparticles 108 can be chemically modified with functional surfactant molecules (FSMs) by immersing the structure into a solution of FSMs. For example, the first layer of nanoparticles 108 may be modified with FSMs 110 by exchanging the oleic acid/oleylamine around the nanoparticles 106 with FSMs 110. Deposition of the second layer of nanoparticles 112 onto the first layer 108 whose surface was modified by the FSMs 110 will bond the second layer of nanoparticles 112 to the first layer of nanoparticles 108 via the FSMs 110. This kind of surface modification process has been successfully demonstrated using various surface chemistry functionalization techniques.

Research has shown that several surfactant molecules can replace the oleic acid/oleylamine around the nanoparticles 106 with FSMs 110 to give various functional surfactant molecule protected particles. The attraction forces among the particles themselves are dispersion forces that are very weak. Accordingly, after the second washing process, the nanoparticles 106 which overlapped are removed, except for the second layer 112. Additional layers of nanoparticles 106 may be may be deposited on the substrate 100 in a similar manner.

As described herein, the inventive process provides for the layer-by-layer self assembly of nanoparticles on a substrate. Using the inventive process, the first monolayer of nanoparticles are formed in the patterned regions on the layer of SAMs. Then, by surface modification of the first layer of nanoparticles with FSMs, the first layer of nanoparticles is covered by the FSMs. The subsequent deposition of nanoparticles onto the FSM modified first nanoparticle layer forms the second layer of nanoparticles. By continuing the inventive process described herein, a multi-layer nanoparticle assembly may be formed.

After a certain thickness of the nanoparticle assembly is achieved, the resist around the patterned regions is stripped. The selection of the solvent for such stripping should avoid the destruction of the nanoparticle assembly achieved inside the patterned regions of the locking pattern on the substrate.

The deposition of nanoparticles can be done by various known techniques, including, but not limited to, thin film coating techniques, such as dip coating, spin cast coating, soaking coating, etc.

While the present invention has been described with particular reference to the drawings, it should be understood that various modifications could be made without departing from the spirit and scope of the present invention. For example, instead of using chemically synthesized magnetic nanoparticles, small ferroelectric nanoparticles could be utilized which self-assemble into the locking pattern in the same manner as the above-described magnetic nanoparticles. The polarization of the ferroelectric nanoparticles could be switched using an electric field in a fashion similar to the perpendicular recording scheme described above for the chemically synthesized magnetic nanoparticles.

We claim:

1. A device for magnetic recording comprising:
 a substrate having a locking pattern formed therein, the locking pattern comprising a plurality of pits formed in the substrate;
 a self-assembled monolayer (SAM) deposited on the substrate in the plurality of pits; and
 a first layer of nanoparticles deposited on the SAM in the plurality of pits and chemically bonded to the substrate via the SAM.

2. The device of claim 1, wherein the SAM comprises molecules selected from the group consisting of alkylsiloxanes, alkylsilanes and alkylthiols.

3. The device of claim 2, wherein the SAM includes functional end groups selected from the group consisting of —OH, —CHO, —COOH, —SH, —CONH$_2$, —NH$_2$ and —CH$_3$.

4. The device of claim 1, further comprising:
 a layer of functional surfactant molecules (FSMs) deposited on the first layer of nanoparticles in the plurality of pits; and
 a second layer of nanoparticles deposited on the layer of FSMs in the plurality of pits and bonded to the first layer of nanoparticles via the FSMs.

5. The device of claim 4, wherein the FSMs comprise molecules selected from the group consisting of adipic acid, adipamide, adiponitrile, dodecanedioic acid, 1,12-dodecanediol, dodecanedioyl dichloride, poly(vinulpyrrolidone) (PVP) and poly(ethylenimine).

6. The device of claim 5, wherein the FSMs include functional end groups selected from the group consisting of —OH, —CHO, —COOH, —SH, —CONH$_2$, —NH$_2$ and —CH$_3$.

7. The device of claim 1, wherein the first layer of nanoparticles comprise chemically synthesized nanoparticles having a grain size of 3–10 nm.

8. The device of claim 7, wherein the chemically synthesized nanoparticles comprise FePt, CoPt, FePd or MnAl nanoparticles.

9. The device of claim 1, wherein the plurality of pits of the locking pattern formed in the substrate include a pit depth of 5–30 nm.

10. The device of claim 1, wherein the nanoparticles include an inorganic material coating.

11. The device of claim 1, wherein the device for magnetic recording comprises a magnetic recording disc for magnetic recording.

12. A magnetic recording device comprising:
 a disc substrate having a locking pattern formed therein, the locking pattern comprising a plurality of pits formed in the substrate in concentric, aligned circular patterns on the disc substrate to define tracks;
 a self-assembled monolayer (SAM) deposited on the disc substrate in the plurality of pits; and
 a first layer of nanoparticles deposited on the SAM in the plurality of pits and chemically bonded to the substrate via the SAM.

13. The device of claim 12, wherein the SAM comprises molecules selected from the group consisting of alkylsiloxanes, alkylsilanes and alkylthiols.

14. The device of claim 13, wherein the SAM includes functional end groups selected from the group consisting of —OH, —CHO, —COOH, —SH, —CONH$_2$, —NH$_2$, and —CH$_3$.

15. The device of claim 12, further comprising:
 a layer of functional surfactant molecules (FSMs) deposited on the first layer of nanoparticles in the plurality of pits; and
 a second layer of nanoparticles deposited on the layer of FSMs in the plurality of pits and bonded to the first layer of nanoparticles via the FSMs.

16. The device of claim 15, wherein the FSMs comprise molecules selected from the group consisting of adipic acid, adipamide, adiponitrile, dodecanedioic acid, 1,12-dodecanediol, dodecanedioyl dichloride, poly(vinulpyrrolidone) (PVP) and poly(ethylenimine).

17. The device of claim 16, wherein the FSMs include functional end groups selected from the group consisting of —OH, —CHO, —COOH, —SH, —$CONH_2$, —$NH_2$, and —$CH_3$.

18. The device of claim 12, wherein the first layer of nanoparticles comprise chemically synthesized nanoparticles having a grain size of 3–10 nm.

19. The device of claim 18, wherein the chemically synthesized nanoparticles comprise FePt, CoPt, FePd or MnAl nanoparticles.

20. The device of claim 12, wherein the plurality of pits of the locking pattern formed in the substrate include a pit depth of 5–30 nm.

21. The device of claim 12, wherein the nanoparticles include an inorganic material coating.

* * * * *